Sept. 4, 1934. C. F. CHAMBERS 1,972,181
GREASE GUN
Filed July 29, 1932
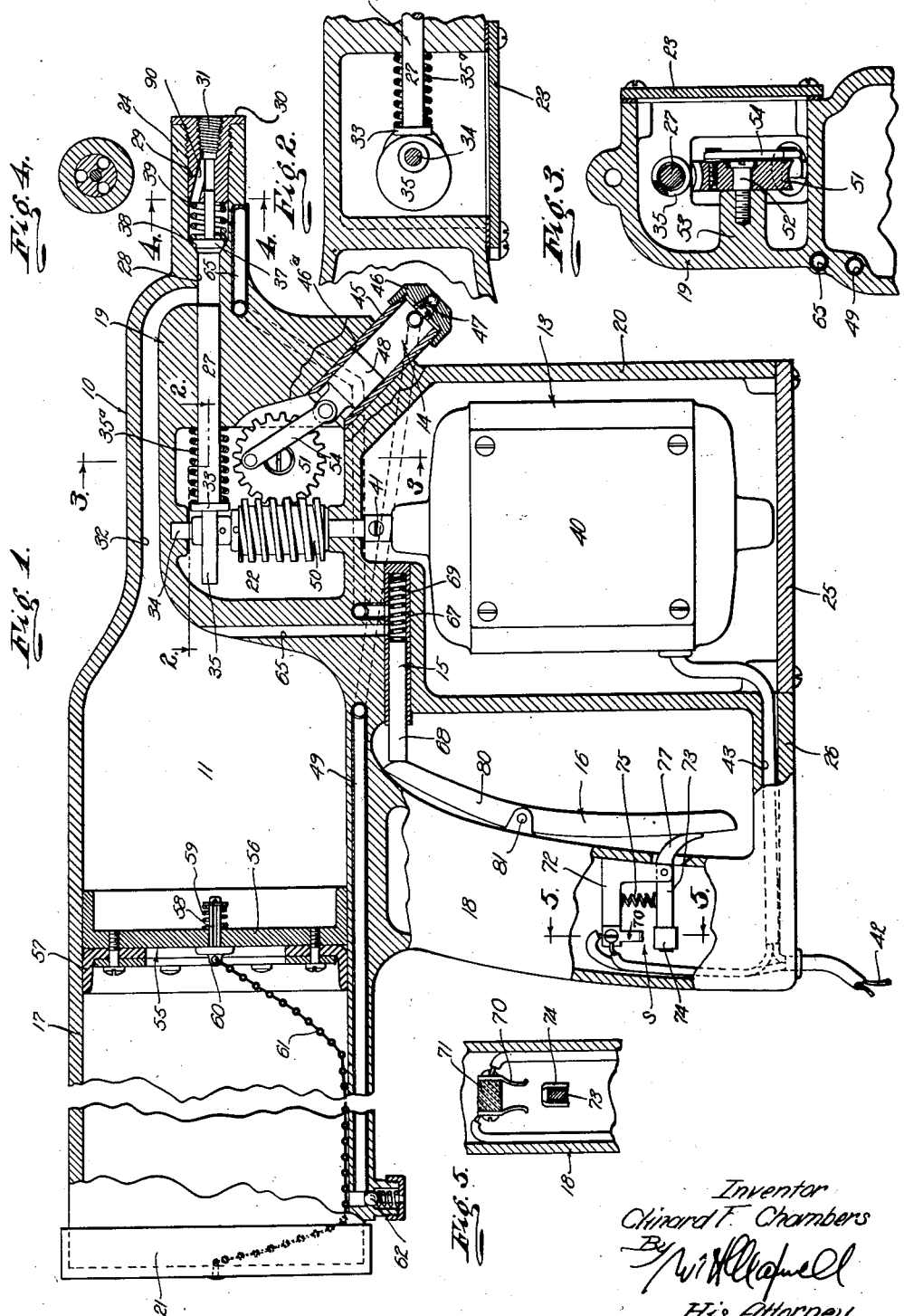
Inventor
Chinard F. Chambers
By
His Attorney Patented Sept. 4, 1934

1,972,181

UNITED STATES PATENT OFFICE 1,972,181

GREASE GUN

Clinard F. Chambers, Los Angeles, Calif., assignor to Alemite Corporation, Chicago, Ill., a corporation of Delaware Application July 29, 1932, Serial No. 625,676

17 Claims. (Cl. 221—47.3)

This invention relates to a lubricating device, and relates more particularly to a lubricant pump or lubricant gun. It is a general object of the present invention to provide a simple, practical and improved lubricant pump or grease gun.

Various types of lubricating devices of the class commonly known as grease guns have been introduced. One form of grease gun that has gone into general use is actuated by air under pressure conducted to the gun by a flexible hose connected with a source of air pressure such as the air reservoir of a stationary compressor. The air hose of a grease gun of the type just mentioned is cumbersome and inconvenient to handle, and often materially interferes with the free use or operation of the device. Further, considerable difficulty has been encountered in providing an effective means for relieving the pressure from the lubricant in the delivery hose or fitting of a grease gun after sufficient lubricant has been supplied to the bearing or other lubricated part and the operation of the gun has stopped.

An object of the present invention is to provide a lubricating device in the form of a grease gun or lubricant pump that is unitary or entirely self-contained and which embodies generally, a lubricant reservoir, power means for operating the lubricant pumping mechanism, and means for supplying or forcing the lubricant from the reservoir to the pumping mechanism.

Another object of the invention is to provide a device of the general character hereinabove mentioned employing in a unique and effective combination electric and pneumatic means.

Another object of the invention is to provide a power grease gun that is economical to operate and maintain in operating condition and which is readily applicable to parts to be lubricated.

It is another object of the invention to provide a unitary or entirely self contained power actuated grease gun that is compact and light in weight so that it can be readily handled with one hand.

It is another object of the invention to provide a lubricating device in the form of a grease gun that does not necessitate the provision of a stationary compressor, reservoir, air lines, etc.

It is another object of the invention to provide a portable self-contained power actuated grease gun in which the pressure on the lubricant in the delivery hose or fitting is automatically released or relieved when operation of the pump stops.

Another object of the invention is to provide a device that is economical and clean in the use of lubricant. Lubricant that might otherwise escape from the device is returned to the reservoir when the device ceases operation.

It is another object of the invention to provide a power actuated grease gun of the character mentioned that includes a simplified and improved by-pass means for automatically by-passing lubricant under pressure from the delivery nozzle, discharge fitting, or hose to the lubricant reservoir of the gun.

It is another object of the invention to provide a lubricant gun or grease gun of the character mentioned that embodies a novel and effective manual control by means of which the control switch of the power means and the by-pass valve may be simultaneously controlled.

It is another object of the invention to provide an entirely self-contained power actuated grease gun that is safe to operate and which is particularly well balanced so that it may be held with great ease and handled with a minimum amount of effort.

It is another object of the invention to provide a unitary power operated grease gun of the character mentioned that is safe to operate and that may be embodied in a form capable of supplying lubricant to the bearings or parts of a machine of high pressures. The device does not have to be supplied with air at high pressure and it is therefore safe to use.

It is a further object of the invention to provide a self-contained power operated grease gun of the character mentioned that is simple and practical in construction and design and that is inexpensive of manufacture.

A further object of the invention is to provide a device of the character mentioned with a pressure relief means which prevents excess pressure developing in the device and makes it practical to employ an inexpensive motor to operate the device.

Other objects and features will be best and more fully understood from the following detailed description of a typical form and application of the invention, throughout which description reference is had to the accompanying drawing, in which:

Fig. 1 is a central longitudinal detailed sectional view of the lubricating device provided by the present invention showing portions of the handle and reservoir in elevation. Fig. 2 is a fragmentary detailed sectional view taken substantially as indicated by line 2—2 on Fig. 1. Fig. 3 is a transverse fragmentary detailed sectional view taken as indicated by line 3—3 on Fig. 1. Fig. 4 is a transverse detailed sectional view taken as indicated by line 4—4 on Fig. 1, and Fig. 5 is a fragmentary detailed sectional view of the switch, being a view taken on line 5—5 on Fig. 1.

The lubricating device or grease gun provided by this invention includes, generally a body 10 having a lubricant reservoir 11, a pump mechanism 12 in the body 10, power means 13 for operating the pump mechanism 12, means 14 for supplying air for forcing lubricant from the reservoir 11 to the pumping mechanism 12, by-pass means 15, and control means 16 for the by-pass means and the power means 13.

The body of the device or grease gun may be varied somewhat in design and configuration without departing from the broader aspects of the invention. However, the preferred embodiment of the invention provides a particularly simple and well balanced body 10. The body 10 consists of a single integral casting including a reservoir portion 17, a grip or handle 18 below the reservoir portion 17, a head 19 containing or housing the pumping mechanism 12, and a case portion 20 projecting downwardly from the head 19 and housing the power means 13.

The reservoir portion 17 of the body is cylindrical in its general configuration and is substantially normal to or horizontal relative to the handle 18. The reservoir opening or chamber 11 for holding the lubricant extends longitudinally through the reservoir portion 17 from its outer end. A removable cap 21 closes the outer end of the reservoir opening 11. The cap 21 may be screw-threaded or otherwise removably attached to the end of the body portion 17. The grip or handle 18 projects downwardly from the under side of the reservoir portion 17. The handle 18 is shaped and proportioned so that it may be conveniently grasped and held, and is located immediately below the lubricant chamber 11, and substantially parallel with the power means 13 so that the device may be easily held and balanced in the hand of the operator as there is little or no tendency for the gun to twist. In accordance with the invention, the handle 18 is hollow to lighten the construction and to house the switch of the power means 13, as will be subsequently described.

The head portion 19 of the body 10 is somewhat smaller in cross section than the reservoir portion 17, and is integrally connected with the forward end of the portion 17. The head 19 is hollow or provided with an opening 22 closed by a removable side plate 23. The sides of the head 19 may be flat as illustrated in the drawing. A cylindrical nozzle 24, projects forwardly from the head. The nozzle 24 is substantially axially aligned with the reservoir portion 17 of the body, and is provided to connect with a lubricant conducting hose or fitting as will be hereafter described. The case portion 20 of the body 10 is a hollow substantially rectangular structure projecting downwardly from the lower end of the head 19. The lower end of the case 20 may be closed by a suitable removable plate 25. The case portion 20 of the body 10 is spaced forwardly from the handle 18, and the lower ends of the case portion and the handle may be joined by a connecting web 26. The body 10 described above may be formed of aluminum or a suitable aluminum alloy, and may be proportioned and constructed so as to be particularly light in weight.

The pump mechanism 12 is operable to pass or discharge lubricant under pressure from the forward end of the nozzle 24. The pressure developing or pumping mechanism 12 is carried in the head 19 and includes a plunger 27 slidable in an opening 28 in the head 19. The opening 28 communicates at its inner end with the opening 22 of the head and extends forwardly into the nozzle 24. The outer end portion 29 of the opening 28, that is the portion of the opening within the nozzle 24, is of enlarged diameter and is adapted to carry a suitable connecting member to receive or connect with the discharge fitting or hose. In the particular case illustrated in the drawing, a connecting member 30 is screw-threaded in the outer end of the opening 29 and is provided at its outer end with a screw-threaded socket 31 adapted to receive a fitting or nipple of a hose, or the like. A lubricant supply port or passage 32 extends forwardly from the reservoir opening 11 and communicates with the opening 28 at a point spaced rearwardly of the enlarged opening 29. The pump plunger 27 projects rearwardly out of the pumping opening 28 into the opening 22 of the head.

The pumping mechanism 12 includes a suitable cam means for operating the plunger 27. A head or enlargement 33 is provided on the projecting inner end of the plunger 27. A rotatable shaft 34 extends transversely or vertically through the head opening 22 and a cam 35 is fixed on the shaft in a position to cooperate with the enlargement 33 on the end of the plunger. The cam 35 may be in the form of a disc eccentrically mounted on the shaft 34 and its periphery may be cylindrical to engage the flat end of the plunger. A spring 35A is arranged under compression between the enlargement 33 on the plunger and the forward wall of the opening 22. The spring 35ª acts to maintain the enlargement 33 of the plunger in proper cooperation with the cam 35 and returns the plunger 27 from its forward or advanced position. The cam 35 is operable to shift or operate the plunger 27 between a position where its forward end is rearward of the discharge end of the passage 32, and a position adjacent the rear end of the enlarged opening 29. It will be apparent how reciprocation of the plunger 27 forces lubricant from the passage 32 forwardly into the opening 29 under pressure. The pumping mechanism includes a suitable check valve 37 normally cooperating with a shoulder or seat 38 at the juncture of the openings 28 and 29. A spring 39 normally holds the valve 37 in the closed position where it prevents the return or backing up of lubricant during the return stroke of the plunger 27. The stem of the valve 37 is guided by the member 30 and spaced openings 90 are provided in the member 30 to connect the opening 29 with the socket 31.

The power means 13 is provided to operate both the pumping mechanism 12 and the means 14. In accordance with the invention the power means 13 includes an electric motor 40 mounted or housed within the casing portion 20 of the body 10. The motor 40 is mounted so that its shaft is in longitudinal or co-axial alignment with the shaft 34. The shaft 34 projects downwardly into the interior of the case portion 20 in the body, and is connected to the motor shaft as at 41. The conductors 42 for carrying the energizing current for the motor 40 may pass out of the case 20 through an opening 43 in the web 26. One lead or conductor 42 extends into the hollow handle 18. The portions of the conductors 42 extending from the body of the gun are flexible, and are of such length as to permit the ready and independent handling of the grease gun. It will be apparent how the motor 40 in rotating the shaft 34 causes rapid reciprocation of the plunger 27, which forces lubricant under pressure from the nozzle 24 into the discharge fitting or hose which may carry suitable coupling means for connecting with a nipple or lubricant receiving bearing on the part to be lubricated.

The means 14 for supplying or delivering the lubricant to the pumping mechanism 12 is in the nature of a pneumatic or fluid pressure means, and is operable to force the lubricant from the reservoir opening 11 to the pump opening 28 under a comparatively small pressure. In accordance with the invention, the pressure developing mechanism of the means 13 is operated by the motor 40. The pressure developing means or compressor, includes a cylinder 45 fixed in an opening 46ª in the head portion 19 of the body. The outer end of the cylinder 45 may project from the head 19 and its projecting end may be closed by a cap 46. A suitable inlet valve 47 is provided in the cap 46. A piston 48 is slidable in the cylinder 47, and is operable to discharge or force air under pressure from the cylinder through a port 49 in the body. The port 49 extends from the forward end of the cylinder 45 through the body 10 to the rear or outer end of the reservoir opening 11. In the preferred embodiment of the invention, the port 49 extends through the wall or partition part of the case 20, and then through the lower wall portion of the reservoir 17.

The drive or means for operating the piston 48 includes a worm 50 on the shaft 34 meshing with a wheel 51 rotatably mounted in the opening 22 of the head. The wheel 51 may be rotatable on a shaft or pin 52 carried by a boss 53. A link 54 is pivotally connected to one side or end of the wheel 51, and has an end pivoted to the piston 48. It will be apparent how the piston 48 is operated or reciprocated in the cylinder 45. It is to be noted that the worm drive between the shaft 34 and the piston 48 provides for a substantial speed reduction.

The means 14 includes a piston 55 slidable in the reservoir opening 11. The piston 55 is adapted to be arranged against the rear end of the body of lubricant or grease in the opening 11 and includes a body or principal part 56 and a packing member or cup-leather 57 for slidably sealing with the wall of the opening 11. Air under pressure admitted to the rear end of the opening 11 through the port 49 acts on the piston 55 to force the lubricant out through the passage 32 into the pumping opening 28. Means is provided to facilitate the removal and handling of the piston 55. A valve 58 normally closes an opening in the main part 56 of the piston. The valve 58 is normally held in the closed position by a spring 59 and is provided at its outer or rear end with an enlargement or head 60. When the head 60 is moved rearwardly, air is admitted behind the piston 55 so that the piston may be easily withdrawn from the reservoir opening 14. A flexible element such as a chain 61 may be attached to the head 60, and the inner side of the removable cap 21 to connect the piston and cap. A blow-off or pressure relief valve 62 is provided to relieve excess air pressure from the rear end of the reservoir opening 11. The pressure relief valve 62 may be in the nature of a spring pressed valve constructed to open when the pressure in the reservoir exceeds a definite comparatively low amount. The valve 62 operates to insure or maintain a definite comparatively low air pressure in the rear end of the reservoir opening 11 which acts through the piston 55 to force the lubricant through the passage 32 to the pumping mechanism.

The by-pass means 15 is operable to by-pass or return lubricant under pressure from the nozzle opening 29 and the discharge hose or fittings to the reservoir opening 11. The by-pass means 15 includes a by-pass port 65 or opening in the head portion 19 of the body which extends from the opening 29 in the nozzle 24 to the rear end or wall of the lubricant reservoir 11. The by-pass 65 or portions of the by-pass may be lined with tubing if desired or found necessary. In the preferred construction, the by-pass opening 65 extends downwardly from the reservoir opening 11 and then forwardly through the lower end portion of the head 19 and then upwardly to connect with the opening 29 in the nozzle 30.

Valve means is provided to control the flow through the by-pass port 65. This valve means may include a cylinder or liner 67 arranged in a horizontal opening in the upper wall or partition of the body case 20. The by-pass port 65 communicates with the interior of the cylinder 67 at spaced points as clearly illustrated in Fig. 1 of the drawing. A valve 68 is slidable longitudinally in the cylinder 67 and is operable between a position where it closes the by-pass opening 65 and a position where it uncovers the portions of the by-pass opening communicating with the cylinder. The valve 68 is normally held in the open position by a spring 69 arranged in the inner end of a cylinder 67. The spring 69 normally holds the valve 68 in a position where it projects forwardly from the rear side of the case portion 20 of the body.

The control means 16 is manually operable to simultaneously control or operate the by-pass valves 68, and a switch S for controlling the energization of the motor 40. The switch S may be of any suitable type or form. In the particular case illustrated in the drawing, the switch S includes spaced contacts 50 attached to a block of insulation carried by a bracket 72. The bracket 72 is attached to the inner side of the forward wall of the handle 18 and pivotally supports a blade 73. Leads or sections of a conductor 42 are electrically connected with the spaced contacts 70. The blade 73 carries at its outer end a clip 74, and the blade is operable between a position where the clip 74 engages the two contacts 70 and a position where the clip is clear of the contacts 70. A spring 75 is provided to normally yieldingly hold the blade 73 in the position where the clip 74 is spaced from and out of engagement with the contacts 70. The blade 73 is provided with a finger 77 which projects forwardly through an opening in the forward side or end of the handle 18.

The control means 16 includes a lever or trigger 80 pivotally mounted on the forward end of the handle 18. The trigger 80 is pivotally connected with the forward face of the handle 18 at a point intermediate its ends by a pivot pin 81. The upper arm of the trigger 80 engages the projecting end of the by-pass valve 68 while the lower arm of the trigger engages the finger 77 of the switch blade 73. The trigger 80 is mounted and proportioned so that the operator's hand engaging or grasping the handle 18 also engages the lower arm of the trigger. It will be apparent that depression of the lower arm of the trigger 80 causes closing of the switch 73 and closing of the by-pass valve 68. The springs 67 and 75 act through the valve stem 68 and finger 77 to normally hold the trigger 80 in the position illustrated in Fig. 1 of the drawing where its lower arm is spaced outward from the handle 18.

It is believed that the operation of the lubricating device or grease gun provided by the present invention will be readily understood from the foregoing detailed description. The cap 21 may be detached from the reservoir portion 17 of the body and the piston 55 removed from the reservoir to allow a supply or charge of grease or other lubricant to be passed into the reservoir opening. After the reservoir has been charged or supplied with lubricant, the piston 55 may be slid into the outer end of the reservoir opening. In arranging the piston 55 in position, the valve 58 may be opened to permit the evacuation of air trapped between the piston and the supply of lubricant. After the cap 21 has been replaced on the reservoir, the device is ready for use. The conductors 42 may be connected with a suitable source of electrical energy and are preferably sufficiently long to permit the free handling of the gun. The operator in operating or handling the grease gun, grasps the handle 18 so that his hand or fingers pass over the lower arm of the trigger 80. After the grease gun has been connected with the lubricant receiving fitting of the part to be lubricated by means of a hose or fitting connected with a connecting member 30, the operator depresses the lower arm of the triger 80 which simultaneously closes the switch S and the by-pass valve 68. Closing of the switch S of course causes energization of the motor 40 which in turn operates or causes reciprocation of the pumping plunger 27 and the compressor piston 48. The compressor delivers air under pressure to the rear end of the chamber 11 through the part 49, which air pressure acts on the piston 55 to force lubricant through the passage 32 to the opening 28. In practice, the valve 62 may be such that it provides for a comparatively low pressure in the rear end of the reservoir chamber 11 so that the lubricant is forced into the opening 28 under low pressure. Reciprocation of the pumping plunger 27 causes charges or portions of the lubricant under pressure to be ejected from the connecting member 30 through the openings 90 and 31 to the fitting or hose connected with the gun, and is thus supplied through the passage 32 to the opening 28, a positive lubricant feed is insured to the pumping opening 28. It is understood, of course, that the valve 37 opens during the ejection of the lubricant from the opening 28 and closes during the return stroke of the plunger 27.

After sufficient lubricant under pressure has been supplied to the bearing or part that is lubricated, and it becomes desirable to disconnect the grease gun from the fitting on the lubricated part, the pressure of the operator's hand on the lower arm of the trigger 80 is relieved or removed so that the springs 67 and 75 simultaneously open the by-pass valve 68 and switch S. Opening of the switch S results in the stopping of the motor 40 and accordingly of the pumping mechanism 12 and compressor 14, and opening of the by-pass valve 68 automatically permits by-passing or lubricant under pressure from the opening 29 and the hose or fitting connected therewith to the reservoir chamber 11 through the by-pass port 65. In this manner, pressure in the hose or fitting connecting the grease gun with the nipple or lubricant receiving fitting on the lubricated part is automatically relieved upon stopping of the motor 40. The grease gun may then be disconnected from the fitting of the lubricated part without the loss of lubricant. It is to be understood that the by-pass valve 68 is normally held open by the spring 69.

The grease gun is entirely self contained in that it includes the lubricant feed means 14 for delivering the lubricant to the pumping mechanism 12 and also includes the motor 40 for driving both the pressure feed means 14 and the pumping mechanism 12. The device is constructed so that it is particularly easy to handle and operate. The main charge of lubricant carried in the reservoir chamber 11 is immediately above the handle 18 so that it is easily supported by the hand of the operator grasping the handle. The motor 40 is forward of and its center of gravity is substantially parallel to the handle 18 while the reservoir portion 17 of the body projects rearwardly from the handle 18 so that it together with its contents, acts to counter-balance or compensate for the weight of the motor 40 and parts at the forward end of the gun.

The portable power actuated grease gun provided by the invention embodies a minimum number of simple sturdy parts and requires little or no attention or lubrication. The motor 40 is readily accessible upon removal of the plate 25, while the parts contained in the opening 22 of the head are accessible on removal of the plate 23. The grease gun provided by this invention is operable to supply or deliver lubricant under high pressure to the part to be lubricated, and is such that no leakage or loss of lubricant occurs when the hose or fitting of the gun is disconnected from the lubricated part.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, a motor for operating said mechanism, means for by-passing lubricant under pressure from the nozzle to the reservoir, and means for simultaneously controlling the motor and the by-pass means.

2. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, means for by-passing lubricant under pressure from the nozzle to the reservoir, and means on the handle for simultaneously controlling the pump mechanism and the by-pass means.

3. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, power means in the body for operating the pump mechanism and said means, means for by-passing lubricant under pressure from the nozzle to the reservoir, and means for simultaneously controlling the power means and the by-pass means.

4. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, power means in the body for operating the pump mechanism and said means, means for by-passing lubricant under pressure from the nozzle to the reservoir, a trigger on the handle operable to control both the power means and the by-pass means.

5. A grease gun including a body having a lubricant reservoir, a handle on the body by means of which the body may be carried by the operator's hand, a discharge nozzle on the body, a pump mechanism in the body for ejecting lubricant under pressure from the nozzle, power means for operating said pump mechanism, means for forcing lubricant from the reservoir to the pump mechanism, there being a by-pass port in the body between said nozzle and the reservoir, a valve for controlling the flow through said port, and manual means for simultaneously controlling the power means and the valve.

6. A grease gun including a body having a lubricant reservoir, a handle on the body by means of which the body may be carried by the operator's hand, a discharge nozzle on the body, a pump mechanism in the body for ejecting lubricant under pressure from the nozzle, power means in the body for operating the pump mechanism, a control for the power means, means for by-passing lubricant under pressure from the nozzle to the reservoir, and means for simultaneously controlling the said control and the by-pass means.

7. A grease gun including a body having a lubricant reservoir, a handle on the body my means of which the body may be carried by the operator's hand, a discharge nozzle on the body, a pump mechanism in the body for ejecting lubricant under pressure from the nozzle, power means in the body for operating the pump mechanism, a control for the power means, means for by-passing lubricant under pressure from the nozzle to the reservoir, and means for simultaneously controlling the said control and the by-pass means, including a trigger on the handle.

8. A grease gun including a body having a lubricant reservoir, a handle on the body by means of which the body may be carried by the operator's hand, a discharge nozzle on the body, a power operated pump mechanism in the body for ejecting lubricant under pressure from the nozzle, means for controlling the application of power to said mechanism, and means for automatically by-passing lubricant under pressure from the nozzle to the reservoir, said last named means being operated upon operation of said control means incidental to the stopping of the pump mechanism.

9. A grease gun including a body having a lubricant reservoir, a handle on the body by means of which the body may be carried by the operator's hand, a discharge nozzle on the body, a pump mechanism in the body for ejecting lubricant under pressure from the nozzle, an electric motor in the body for operating the pump mechanism, a switch for controlling the motor, means operable to return lubricant under pressure from the nozzle to the reservoir, and means for simultaneously operating the switch and controlling the last mentioned means.

10. A grease gun including a body having a lubricant reservoir, a handle on the body by means of which the body may be carried by the operator's hand, a discharge nozzle on the body, a pump mechanism in the body for ejecting lubricant under pressure from the nozzle, an electric motor in the body for operating the pump mechanism, a switch carried by the handle for controlling the motor, there being a port in the body between the nozzle and the reservoir, a valve for controlling the flow through the port, and a manually operable member on the handle for operating both the switch and the valve.

11. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, an electric motor carried by the body for operating both the pump mechanism and the said means, there being a by-pass port between the nozzle and the reservoir and a valve for controlling flow through the port, a switch for controlling the motor, and a manually operable member for controlling both the valve and the switch.

12. A grease gun including a body having a lubricant reservoir, a handle on the body by means of which the body may be carried by the operator's hand, a discharge nozzle on the body, a pump mechanism in the body for ejecting lubricant under pressure from the nozzle, means for forcing lubricant from the reservoir to the pump mechanism, an electric motor carried by the body for operating both the pump mechanism and the said means; there being a by-pass port between the nozzle and the reservoir and a valve for controlling flow through the port, a switch for controlling the motor, and a manually operable member on the handle for controlling both the valve and the switch.

13. A power operated lubricant compressor comprising, a source of lubricant under low pressure, a pump receiving lubricant from said source and ejecting it under high pressure, said pump including an outlet, power means for operating said pump, an element to control the operation of said power means, and means operable by said element to connect said outlet with said low pressure source.

14. A power operated lubricant compressor comprising, a source of lubricant under low pressure, a high pressure pump receiving lubricant from said source, power means for operating said pump, a conduit connecting the discharge outlet of said pump with said source, a valve in said conduit, control means for said power means, and a manually actuated member for operating both said control means and said valve.

15. A power operated lubricant compressor comprising, a source of lubricant under low pressure, a high pressure pump connected to receive lubricant from said source and having a passageway through which the lubricant is ejected under high pressure, a by-pass conduit connecting said passageway with said source, a valve for controlling the flow of lubricant through said conduit, power means for actuating said pump, and means for opening said valve to permit flow of lubricant from said passageway to said source when said pump is not being operated by said power means.

16. A power operated lubricant compressor comprising, a source of lubricant under low pressure, a high pressure pump connected to receive lubricant from said source and having a passageway through which the lubricant is ejected under high pressure, a by-pass conduit connecting said passageway with said source, a valve for controlling the flow of lubricant through said conduit, power means for actuating said pump, a manually operable element for rendering said power means operative, and means operated by said element for closing said valve when said power means is driving said pump.

17. A power operated lubricant compressor comprising a high pressure pumping mechanism having a discharge passageway, means to supply lubricant to said mechanism under relatively low pressure, power means for operating said high pressure pumping mechanism, and means actuated incidental to the cessation of operation of said high pressure pumping mechanism to relieve the lubricant pressure in said discharge passageway.

CLINARD F. CHAMBERS.